United States Patent
Popuri et al.

(10) Patent No.: US 11,513,862 B2
(45) Date of Patent: Nov. 29, 2022

(54) SYSTEM AND METHOD FOR STATE MANAGEMENT OF DEVICES

(71) Applicant: Dell Products L.P., Hopkinton, MA (US)

(72) Inventors: Tandava Venkata Krishna Popuri, Bengaluru (IN); Vaideeswaran Ganesan, Bengaluru (IN); Pravin Janakiram, Bangalore (IN); Balaji Bondhili Singh, Bangalore (IN); Suren Kumar, Vellore (IN)

(73) Assignee: Dell Products L.P., Round Rock, TX (US)

( * ) Notice: Subject to any disclaimer, the term of this patent is extended or adjusted under 35 U.S.C. 154(b) by 311 days.

(21) Appl. No.: 16/877,253

(22) Filed: May 18, 2020

(65) Prior Publication Data

US 2021/0311787 A1     Oct. 7, 2021

(30) Foreign Application Priority Data

Apr. 4, 2020   (IN) .............................. 202011014980

(51) Int. Cl.
  *G06F 9/46*   (2006.01)
  *G06F 9/50*   (2006.01)
  *G06F 9/48*   (2006.01)

(52) U.S. Cl.
  CPC .............. *G06F 9/505* (2013.01); *G06F 9/485* (2013.01); *G06F 9/5005* (2013.01); *G06F 9/5038* (2013.01); *G06F 2209/508* (2013.01)

(58) Field of Classification Search
  CPC ........ G06F 9/505; G06F 9/485; G06F 9/5005; G06F 9/5038; G06F 2209/508
  See application file for complete search history.

(56) References Cited

U.S. PATENT DOCUMENTS 9,020,873 B1 *  4/2015  Duffy ..................... G06N 20/00
                                                      706/46
10,613,606 B2 *  4/2020  Min ..................... G06F 1/3206

FOREIGN PATENT DOCUMENTS

CN           103019808 B  *  8/2016  ........... G06F 9/4887

\* cited by examiner

*Primary Examiner* — Diem K Cao
(74) *Attorney, Agent, or Firm* — Chamberlain, Hrdlicka, White, Williams & Aughtry

(57) ABSTRACT

A deployment manager includes storage for storing a state repository including a state transitions associated with event descriptions generated by a computing device and a computing device manager. The computing device manager obtains a new event description associated with the computing device, and a workload performed by the computing device; in response to obtaining the new event description: matches the new event description to a state transition of the state transitions; and manages the workload based on a predicted next state associated with the state transition.

17 Claims, 8 Drawing Sheets

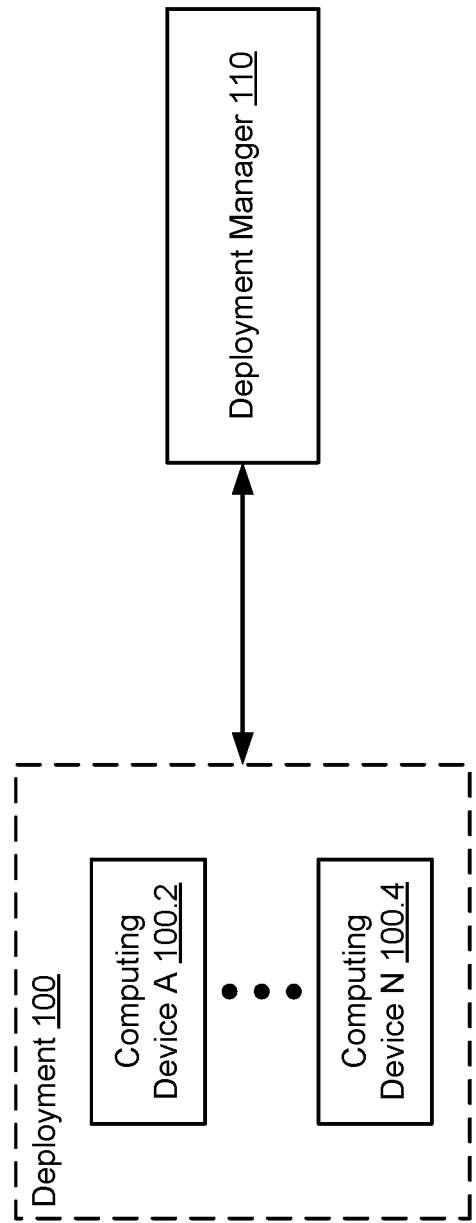
FIG. 1.1

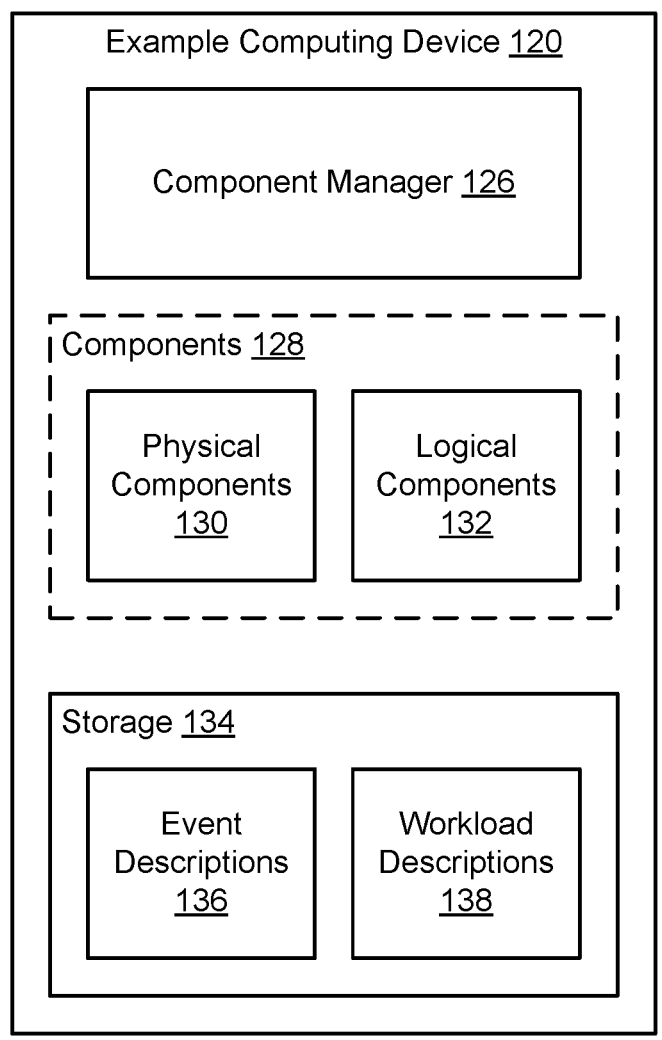
FIG. 1.2

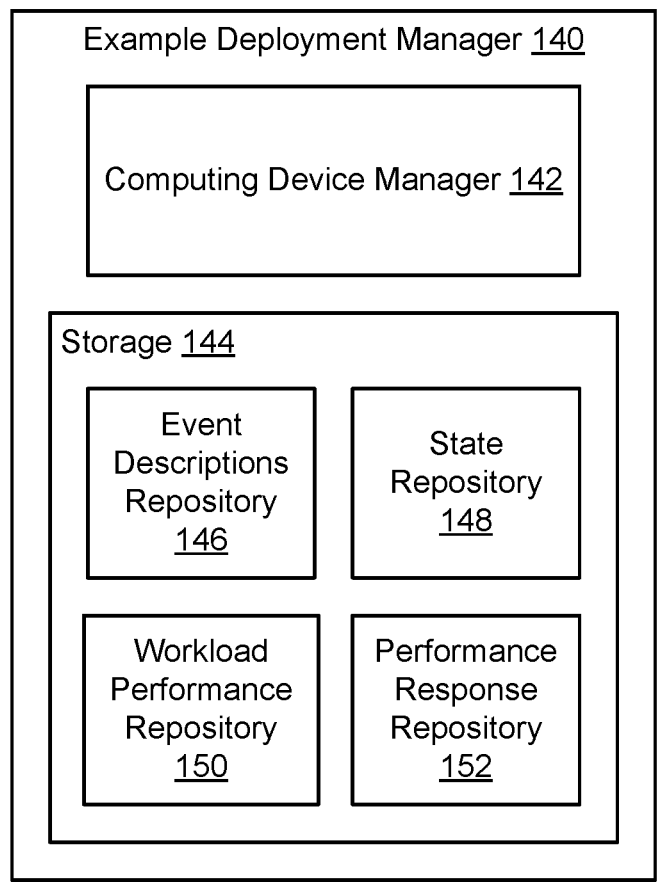
FIG. 1.3

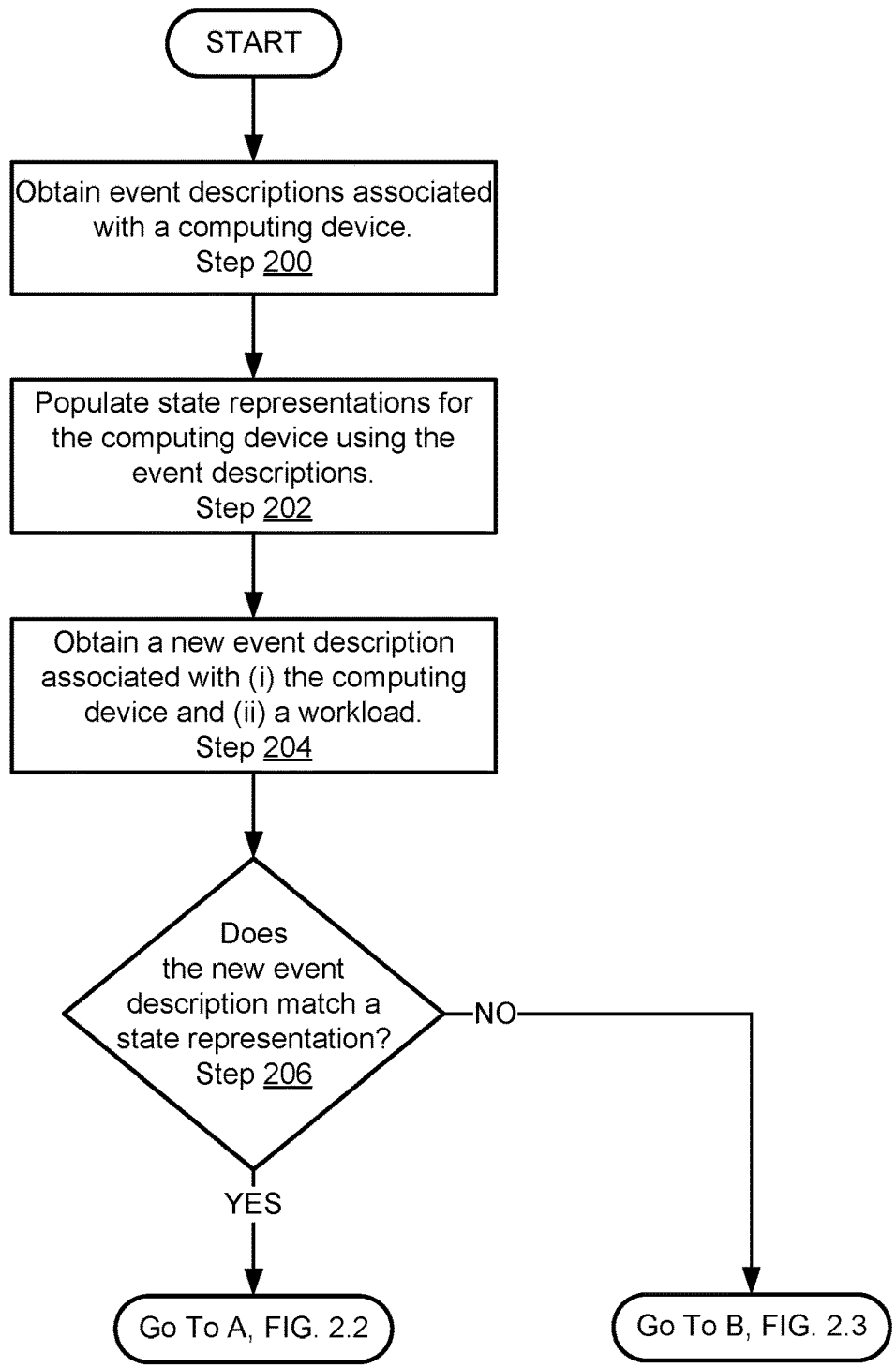
FIG. 2.1

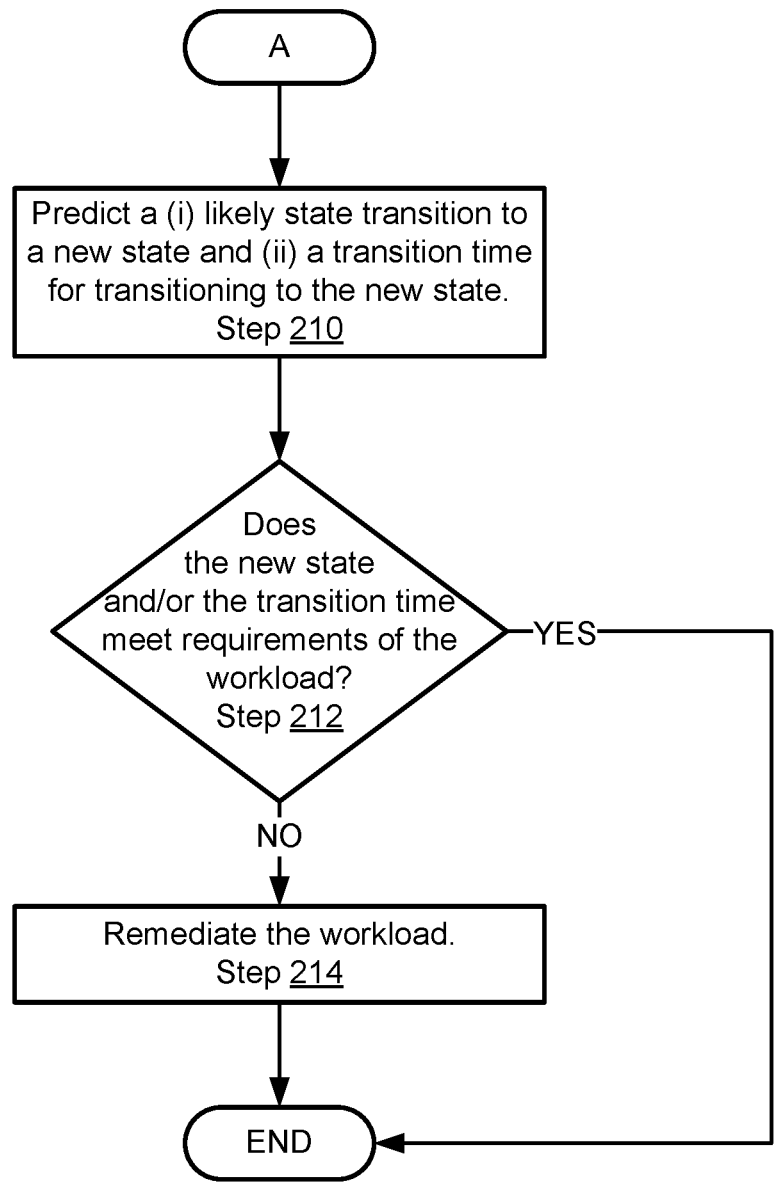
FIG. 2.2

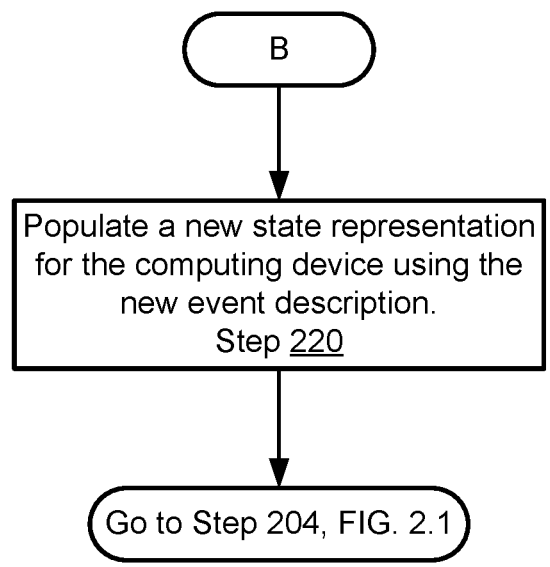
FIG. 2.3

SYSTEM AND METHOD FOR STATE MANAGEMENT OF DEVICES

BACKGROUND

A computing device may include components such as processors, memory, storage devices, etc. that provide computing resources. The computing resources of the computing device may be used to perform workloads or other types of tasks. Performing workloads or other tasks may cause the computing device to provide services to other devices.

SUMMARY

In one aspect, a deployment manager in accordance with one or more embodiments of the invention includes storage for storing a state repository including a state transitions associated with event descriptions generated by a computing device; and a computing device manager that obtains a new event description associated with the computing device, and a workload performed by the computing device; in response to obtaining the new event description: matches the new event description to a state transition of the state transitions; and manages the workload based on a predicted next state associated with the state transition.

In one aspect, a method for managing a computing device using state transitions associated with event descriptions generated by the computing device in accordance with one or more embodiments of the invention includes obtaining a new event description associated with the computing device, and a workload performed by the computing device; in response to obtaining the new event description: matching the new event description to a state transition of the state transitions; and managing the workload based on a predicted next state associated with the state transition.

In one aspect, a non-transitory computer readable medium in accordance with one or more embodiments of the invention includes computer readable program code, which when executed by a computer processor enables the computer processor to perform a method for managing a computing device using state transitions associated with event descriptions generated by the computing device, the method includes obtaining a new event description associated with the computing device, and a workload performed by the computing device; in response to obtaining the new event description: matching the new event description to a state transition of the state transitions; and managing the workload based on a predicted next state associated with the state transition.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example computing device in accordance with one or more embodiments of the invention.

FIG. 1.3 shows a diagram of an example deployment manager in accordance with one or more embodiments of the invention.

FIG. 2.1 shows a flowchart of a method of managing computing devices in accordance with one or more embodiments of the invention.

FIG. 2.2 shows a first continuation of the flowchart of FIG. 2.1.

FIG. 2.3 shows a second continuation of the flowchart of FIG. 2.1.

DETAILED DESCRIPTION

Figure 3:
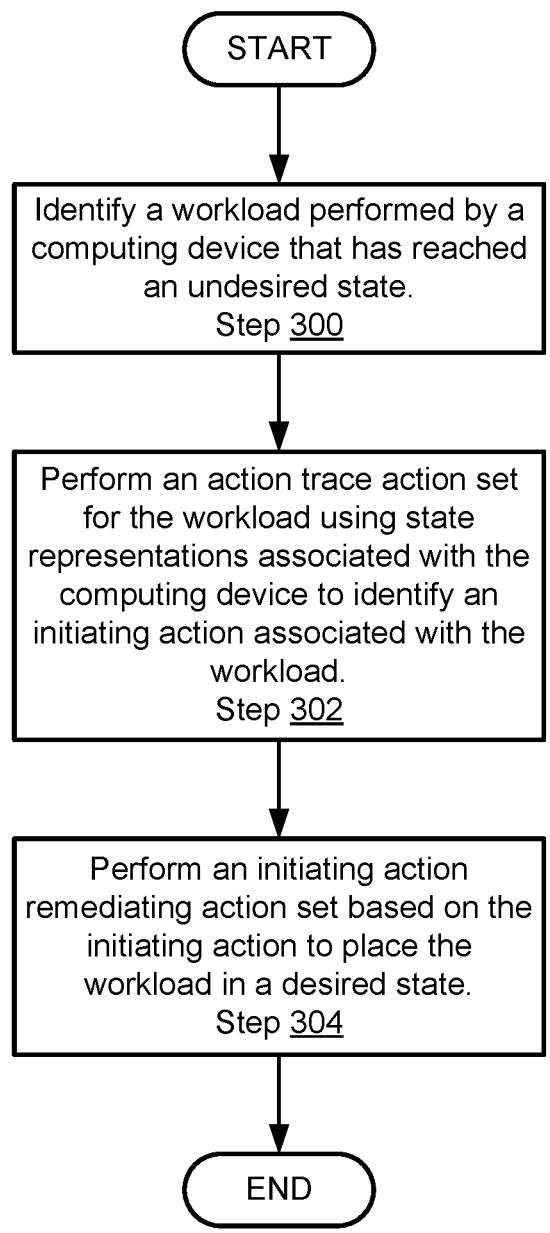
FIG. 3 shows a flowchart of a method of remediating an undesirable state in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing workloads performed by computing devices. A workload may include one or more tasks to be performed by one or more computing devices. To complete the one or more tasks, components of the one or more computing devices may need to operate in desired manners. For example, if a component of a computing device enters a failure state or other state that negatively impacts the ability of a computing device to complete one or more tasks of a workload, performance of the workload may be impeded.

Embodiments of the invention may provide a system that is able to ascertain a current state of a computing device and predict the likely next states of the computing device and/or components thereof. The predictions may be used to proactively and/or reactively manage the computing device to avoid undesirable states that may negatively impact performance of the workload.

To predict the likely next state of the computing device and/or components thereof, the system may obtain alerts and/or other types of data structures generating by the computing device that includes information regarding the operation of the computing device. The system may use the obtained alerts generate a state model of the computing device. The state model may be used to determine the likely next states (e.g., a state transition to a new state) and associate the likely next states with future alerts that may be obtained from the computing device. By doing so, when alerts are obtained in the future the system may be able to predict (i) a likely next state and (ii) time between when the alert is generated and when a state transition will occur (e.g., a transition time). The likely next state and transition time may be used to ascertain whether corrective action (e.g., modifying the operation of the computing device) should be performed.

Additional embodiments of the invention may enable an initial cause (e.g., an event such as an administrator-initiated action) of an undesired state that may impact the ability of the system to perform a workload to be identified. The initial cause may be identified by tracing back through a series of events using the state model to identify a series of state transitions that link an undesired state to an initial cause. By doing so, the initial cause of the undesired state may be remediated thereby enabling a workload to more likely to be successfully performed to completion.

FIG. 1.1 shows an example system in accordance with one or more embodiments of the invention. The system may include deployment (100) that provides computer implemented services. The computer implemented services may include any type and quantity of computer implemented services. The computer implemented services may include, for example, database services, electronic communication services, data storage services, etc.

The deployment (100) may utilize computing devices (e.g., 100.2, 100.4) to provide computer implemented services. The manner of operation of each of the computing devices of the deployment (100) may impact the overall operation of the deployment.

Over time, the manner in which a computing device operates may change. Each of the computing devices of the deployment (100) may operate in different manners (e.g., be in different operation states) depending on how each respective computing device is contributing to the computer services provided by the deployment. Additionally, over time the functionality of a computing device may change due to, for example, failure of a service running on the computing device, application of an update that modifies that manner in which a computing device operates in a particular operating state, changes in operation due to an instruction from a management entity, encountering a bug or other unexpected and/or unplanned for event, etc. Thus, over time the operating states of the computing devices may change.

Changes to the operating state of a computing device may negatively and/or positively impact the ability of the computing device to contribute to the computer implemented services provided by the deployment (100). For example, if a computing device encounters a bug in a software program executing on the computing device, the computing device may need to enter a recovery state (e.g., reload drivers, software, etc.) for a period of time before being able to return to a normal operating state. While in the recovery state the computing device may be unable or have a reduced capacity to contribute to the computing services provided by the deployment (100).

To manage its ability to provide its computing services, management entities (not shown), other types of entity of the deployment (100), and/or other entities that are not a portion of the deployment (100) may desire to have access to information indicative of (i) a current operating state of one or more of the computing devices of the deployment (100), (ii) the potential next operating states (e.g., next state/states) that the computing devices will enter following its current state, (iii) the likelihoods of entering any of the potential next operating states, and/or (iv) the durations of time it is likely to take (e.g., transition times) before transition to the potential next operating states. By obtaining such information management entities of the deployment (100) and/or other entities may be make more likely to make appropriate decisions with respect to how to manage the deployment (100) and/or other entities (e.g., other deployments, other computing devices, etc. that may need to consider how the deployment and/or portions thereof are likely to operate in the future).

For example, consider a scenario where the deployment (100) provided (i) database services and (ii) electronic communication services. In this scenario, the deployment (100) includes 2 computing devices that provide the database services and 6 computing devices that provide the electronic communication services. At a first point in time, the deployment (100) obtains a prediction that a much larger load (e.g., higher demand for the services) for database services is going to occur while the load for electronic communication services will rapidly decline. In this scenario, the deployment (100) may attempt to proactively address this scenario by reallocating computing devices from providing electronic communication services to providing database services. However, if the deployment is unaware of how likely that the computing devices currently providing electronic communication services are likely to be able to provide database services in the future, the deployment may reallocate computing devices that are unlikely to be able to provide database services in the future (due to, for example, a bug that will require the computing devices that are to be reallocated to enter a recovery state during which they are unable to effectively provide database services). Consequently, reallocating these computing devices may not be able to effectively proactively address the future database workload. Accordingly, poor quality database services may be provided by the deployment when the high database services load is encountered even though the computing devices have been reallocated.

Embodiments of the invention may provide a method and/or system for providing access to information indicative of (i) a current operating state of one or more of the computing devices of the deployment (100), (ii) the potential next operating states (e.g., next state/states) that the computing devices will enter following its current state, (iii) the likelihoods of entering any of the potential next operating states, and/or (iv) the durations of time it is likely to take (e.g., transition times) before transition to the potential next operating states. A system in accordance with embodiments of the invention may use such information to proactively manage its operation.

By doing so, the performance of the system may be improved by making the management decisions (e.g., modifying the operation of its components and/or components of other devices) made by the system more likely to positively contribute to the operation of the system. Consequently, the operation of the deployment may be improved by improving the efficiency of its operation (e.g., providing higher quality of computer implemented services), proactively reallocating resources to address future workloads, reducing the likelihood that components of the system enter unrecoverable failure states, and/or otherwise improve the ability of the deployment to provide computer implemented services.

To provide the above noted functionality, the system of FIG. 1.1 may also include a deployment manager (110). The deployment manager (110) may provide computing device management services. Providing computing device management services may include (i) providing information regarding the likely future operating states of the computing devices, (ii) identifying when the computing devices have entered undesirable operating states, and/or (iii) remediating undesirable operating states of the computing devices. By doing so, the system of FIG. 1.1 may provide a deployment (100) that have improved functionality.

While the system of FIG. 1.1 is illustrated as including a deployment and a deployment manager, a system in accordance with embodiments of the invention that include any number of deployment (and/or other arrangement of computing devices) and deployment managers. The deployment managers may provide computing device management services to any number of computing devices (that are portions of the same deployment, different deployments, and/or other arrangement of computing devices).

The components of the system illustrated in FIG. 1.1 may be operably connected to each other and/or operably connected to other entities (not shown) via any combination of wired and/or wireless networks. Each component of the system illustrated in FIG. 1.1 is discussed below.

The deployment (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3. The deployment (100) may be implemented using other types of computing devices without departing from the invention. For additional details regarding computing devices, refer to FIG. 4.

The deployment (100) may be implemented using logical devices without departing from the invention. For example, the deployment (100) may be implemented using virtual machines that utilize computing resources of any number of physical computing devices to provide the functionality of the deployment (100). The deployment (100) may be implemented using other types of logical devices without departing from the invention.

In one or more embodiments of the invention, the deployment (100) provides computer implemented services. For example, the deployment (100) may provide database services, electronic communication services, file storage services, or any other types of computer implemented services. The deployment (100) may provide any number of types and/or quantities of computer implemented services. The system of FIG. 1.1 may include any number of deployments.

To provide computer implemented services, the deployment (100) may include any number of computing devices. Each of the computing devices may operate in accordance with any number of operating states (e.g., modes of operation). However, the operating states of the computing device may not be known. For example, each of the computing devices may have any number of components that when operating give rise to any number of operating modes by virtue of their interactions between each other. For additional details regarding components of a computing device and its operating modes, refer to FIG. 1.2.

To enable likely future operating states of the computing devices to be determined, the computing devices may provide information regarding their operation to the deployment manager (110). For example, the computing devices (e.g., 100.2, 100.4) may provide alerts, logs, and/or other types of data structures generated as part of the operation of the computing devices to the deployment manager (110). As will be discussed below, the deployment manager (110) may use the aforementioned information to ascertain potential state transitions for the computing devices that are likely to occur in the future.

Additionally, the computing devices may include functionality to enable the deployment manager (110) to modify their respective operation. For example, the computing devices may include functionality to obtain messages or other data structures from the deployment manager (110) indicative of a change in operation and implemented the change in operation. An example of a change in operation of a computing device may be a termination and/or instantiation of a workload with new parameters that cause the computing device to perform the workload in a different manner. The computing devices may obtain and/or implemented other types of changes in operation from the deployment manager without departing from the invention.

Each of the deployments may be associated with one or more corresponding organizations. The corresponding organizations may be, for example, companies. Each of the companies may be associated with an industry. For example, a company that produces automobiles may be associated with the automotive industry. In another example, a company that provides banking services may be associated with the banking industry.

The computing devices may also include functionality to provide different types of information regarding their operation without departing from the invention. For additional details regarding the functionality of the computing devices (e.g., 100.2, 100.4) of the deployment (100), refer to FIG. 1.2.

The deployment manager (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3. The deployment manager (110) may be implemented using other types of computing devices without departing from the invention. For additional details regarding computing devices, refer to FIG. 4.

The deployment manager (110) may be implemented using logical devices without departing from the invention. For example, the deployment manager (110) may be implemented using virtual machines that utilize computing resources of any number of physical computing devices to provide the functionality of the deployment manager (110). The deployment manager (110) may be implemented using other types of logical devices without departing from the invention.

In one or more embodiments of the invention, the deployment manager (110) provides computing device management services. By providing computing device management services, the likely future operating states of the computing devices may be identified and used to manage the computing devices of the deployment (100). Consequently, the assumptions used to select how to manage the computing devices may be more likely to be accurate. For additional details regarding the deployment manager (110), refer to FIG. 1.3.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

As discussed above, the computing devices of the deployment (100) may cooperatively provide computer implemented services. FIG. 1.2 shows a diagram of an example computing device (120) in accordance with one or more embodiments of the invention. The example computing device (120) may be similar to any of the computing devices (e.g., 100.2, 100.4) discussed with respect to FIG. 1.1. As discussed above, the example computing device (120) may provide, in part, the computer implemented services provided by the deployment (100) of FIG. 1.1. The computing devices (120) may provide the computer implemented services in any manner without departing from the invention.

To provide the aforementioned functionality of the example computing device (120), the example computing device (120) may include a component manager (126), components (128), and storage (134). Each component of the example computing device (120) is discussed below.

The components (128) may include any number of physical components (130) (e.g., processors, network interface card, storage controllers, etc.) and/or logical components (132) (e.g., operating systems, drivers, applications, etc.). The logical components (132) may be implemented using computer instructions (e.g., computer code) stored on a non-transitory computer readable medium that when executed by a physical component (e.g., a processor) gives rise to the logical component. The physical and logical components of the respective computing devices may perform actions when a computing device is operating that give rise to the functionality of the computing device. The operation of any of the components (128) may change overtime. Thus, the operating state of any of the components (128) may change over time.

The collective operation of the components (128) may give rise to an operating state of the example computing device (120). Thus, a change in an operating state of any of the components (128) may give rise to a change in the operating state of the example computing device (120).

The operating states of the components (128) and/or the example computing device (120) may not be known. For example, the components may not provide explicit information indicative of their current operating state.

The components (128) may provide some information regarding their operation. For example, the components (128) may provide event descriptions (136). An event description may be a data structure (e.g., an alert, a log, etc.) that may include information that may be relevant to ascertaining a state or state transition of the example computing device (120). For example, an event description may specify a completion of a process which may indicate an end of an operating state of a component and, in turn, the example computing device.

An event description may not include information that is relevant to ascertaining a state or state transition of the example computing device (120). For example, an event description may specify the occurrence of an event that is unrelated to an end to an existing state, a start of a new state, etc. Consequently, a large number of event descriptions (e.g., more than 90%) may include information that is irrelevant to ascertaining state information regarding a component or the example computing device.

The informational content of the event descriptions may be in human readable format (e.g., plain text) and include a large amount of information. Additionally, the number of event descriptions generated by the example computing device (120) may be large. Consequently, ascertaining state information by reading of the event descriptions by a person may be impractical. For example, the example computing device (120) may generate thousands of event descriptions (136) per day with content that requires substantial interpretation for meaning regarding the state of the example computing device (120) to be ascertained.

The operation of the components (128) may support performance of workloads (not illustrated). Workloads may be a collection of actions performed by the components (128) that cause a predetermined task to be completed. For example, when providing database services, the example computing device (120) may perform any number of workloads that collectively cause the database services to be provided.

The component manager (126) may provide component management services. Providing component management services may include (i) providing the event descriptions (136) to other entities (e.g., a deployment manager), (ii) generating workload descriptions (130) regarding the workloads being performed by the example computing device (120), (iii) providing the workload descriptions (130) to other entities (e.g., a deployment manager, and/or (iv) obtaining changes to the operation of the example computing device (120) (e.g., from a deployment manager or an administrator) and implementing the changes (e.g., modifying the operation of one or more of the components (128)) to the operation of the example computing device. By providing component management services, useful information regarding state transitions of the example computing device (120) may be identified and used to manage the operation of the example computing device (120). Consequently, the operation of the example computing device (120) may be improved by making it more likely that the assumptions underlying the management decisions for the example computing device (120) are more likely to be accurate.

In one or more embodiments of the invention, the component manager (126) is implemented using a hardware device including circuitry. The hardware device may be, for example, a digital signal processor, a field programmable gate array, or an application specific integrated circuit. The component manager (126) may be implemented using other types of hardware devices without departing from the invention.

In one or more embodiments of the invention, the component manager (126) is implemented using computing code stored on a persistent storage that when executed by a processor performs the functionality of the component manager (126). The processor may be a hardware processor including circuitry such as, for example, a central processing unit or a microcontroller. The processor may be implemented using other types of hardware devices for processing digital information without departing from the invention.

In one or more embodiments disclosed herein, the storage (134) is implemented using devices that provide data storage services (e.g., storing data and providing copies of previously stored data). The devices that provide data storage services may include hardware devices and/or logical devices. For example, storage (134) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (134) may include a memory device (e.g., a dual in line memory device) in which data is stored and from which copies of previously stored data are provided. In another example, storage (134) may include a persistent storage device (e.g., a solid-state disk drive) in which data is stored and from which copies of previously stored data is provided. In a still further example, storage (134) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (134) may store data structures including event descriptions (136) and workload descriptions (138). Each of these data structures is discussed below.

The event descriptions (136) may include one or more data structures that include information regarding the operation of the components. For example, the event descriptions (136) may include alerts, logs, or other types of data structures that include information regarding events encountered by the components (128).

In one or more embodiments of the invention, the event descriptions (136) are implemented as human readable text. For example, the event descriptions (136) may include noun-verb phrases. The noun-verb phrases may include information regarding the operation of and/or events encountered by the components (128).

The event descriptions (136) may include information regarding, for example, bugs encountered by the components (128), beginning and/or ends of activities performed by the components (128), health information reflecting the operation of the components (128), etc. The event descriptions (136) may include any type and/or quantity of information.

In one or more embodiments of the invention, the event descriptions (136) do not implement a common reporting standard for the information content included in the event descriptions (136). For example, different components may provide different types of information, may provide the information using different terminology, may use different syntaxes for providing the information, etc. In one or more embodiments of the invention, the event descriptions (136) are not adapted for consumption (e.g., reading and interpretation) by a computing device. In other words, the information included in all, or a portion, of the event descriptions (136) is not keyed to symbols, words, or other arrangements of binary information in a manner that facilitates consumption by a computing device.

In one or more embodiments of the invention, the event descriptions (136) are not adapted to provide state information regarding the components. In other words, the information included in all, or a portion, of the event descriptions (136) is not keyed to or otherwise structured to indicate a state and/or change in state of the components.

For example, the event descriptions (136) may include data structures that include plain, human readable text that provide information that reflects all, or a portion, of the operation of one or more of the components.

The workload descriptions (138) may include one or more data structures that include information regarding workloads being performed by the example computing device (120). The information may include, for example, identifiers of the workloads, parameters used to initiate execution of the workloads, identifiers of components contributing to performance of the workloads, actions being performed by the components contributing to performance of the workloads, actors that initiated performance of the workloads, etc.

The event descriptions (136) and/or workload descriptions (138) may be maintained (e.g., generated, modified, etc.) by the component manager (126).

While the data structures stored in storage (134) have been described as including a limited amount of specific information, any of the data structures stored in storage (134) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example computing device (120) has been described and illustrated as including a limited number of components for the sake of brevity, a computing device in accordance with embodiments of the invention may include additional, fewer, and/or different components than those illustrated in FIG. 1.2 without departing from the invention.

As discussed above, the deployment manager (110) of FIG. 1.1 may provide computing device management services for computing devices of a deployment. FIG. 1.3 shows a diagram of an example deployment manager (140) in accordance with one or more embodiments of the invention. The example deployment manager (140) may be similar to the deployment manager (110) discussed with respect to FIG. 1.1.

To provide computing device management services, the example deployment manager (140) may include a computing device manager (142) and storage (144). Each component of the example deployment manager (140) is discussed below.

The computing device manager (142) may provide the computing device management services provided by the example deployment manager (140). Computing device management services may include (i) ascertaining operating states and/or likely future operating states of computing devices, (ii) identifying undesired operating states of the computing devices, and (iii) remediating the undesired operating states of the computing devices using, in part, the ascertained operating states.

To provide its functionality, the computing device manager (142) may send instructions via messages or other signaling methods to the component managers (e.g., 126, FIG. 1.2) of computing devices. The component managers may perform the instructions (e.g., obtaining and providing information, modifying operation of components of the computing devices, etc.) in response to receiving the instructions.

When providing its functionality, the computing device manager (142) may store and utilize data structures in storage (144). For example, the computing device manager (142) may obtain event descriptions from computing devices and store them in a repository (e.g., 146), may obtain workload descriptions from computing devices and store them in a repository (e.g., 150), etc.

The computing device manager (142) may use the aforementioned information to ascertain the states and/or likely futures state of the computing devices. The computing device manager (142) may store information representative of the states and/or likely future states in a state repository (148). Similarly, the computing device manager (142) may use the aforementioned information to ascertain whether workloads that are being performed are going to be completed. If unlikely to be completed, the computing device manager (142) may use information included in a performance response repository (152) to modify the operation of a computing device to make it more likely that performance of a workload will complete successfully.

In one or more embodiments of the invention, the computing device manager (142) is implemented using a hardware device including circuitry. The hardware device may be, for example, a digital signal processor, a field programmable gate array, or an application specific integrated circuit. The computing device manager (142) may be implemented using other types of hardware devices without departing from the invention.

In one or more embodiments of the invention, the computing device manager (142) is implemented using computing code stored on a persistent storage that when executed by a processor performs the functionality of the computing device manager (142). The processor may be a hardware processor including circuitry such as, for example, a central processing unit or a microcontroller. The processor may be implemented using other types of hardware devices for processing digital information without departing from the invention.

When providing its functionality, the computing device manager (142) may perform all, or a portion, of the methods illustrated in FIGS. 2.1-3.

In one or more embodiments disclosed herein, the storage (144) is implemented using devices that provide data storage services (e.g., storing data and providing copies of previously stored data). The devices that provide data storage services may include hardware devices and/or logical devices. For example, storage (144) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (144) may include a memory device (e.g., a dual in line memory device) in which data is stored and from which copies of previously stored data are provided. In another example, storage (144) may include a persistent storage device (e.g., a solid state disk drive) in which data is stored and from which copies of previously stored data is provided. In a still further example, storage (144) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (144) may store data structures including an event descriptions repository (146), a state repository (148), a workload performance repository (150), and a performance response repository (152). Each of these data structures is discussed below.

The event descriptions repository (146) may include one or more data structures that include information regarding event descriptions obtained from computing devices. For example, the event descriptions repository (146) may include all, or a portion, of the information included in event descriptions (e.g., 136, FIG. 1.2) from one or more computing devices. The information included in the event descriptions repository (146) may be associated with computing devices from which the information was obtained.

The state repository (148) may include one or more data structures that include information regarding the operating states of the computing devices. For example, the state repository (148) may include information reflecting (i) the likelihood that a computing device will enter a particular state and (ii) the likely duration of time before the computing device will enter the particular state.

The state repository (148) may be implemented as, for example, a table that includes any number of rows. Each of the rows may include information keyed to alerts or other types of data structures generated by the computing devices. The rows may also specify (i) one or more likely next states into which the computing device is likely to enter, (ii) a probability for each of the one or more likely next states, and/or (iii) a duration of time for each of the one or more likely next states reflecting how long it will likely take before the occurrence (e.g., generation of) of the alert (or other data structure) and the occurrence of the state transition.

The workload performance repository (150) may include one or more data structures that include information regarding workloads being performed by the computing devices. For example, the workload performance repository (150) may include all, or a portion, of the information included in workload descriptions (e.g., 138, FIG. 1.2) from one or more computing devices. The information included in the workload performance repository (150) may be associated with computing devices and workloads from which the information was obtained.

The performance response repository (152) may include one or more data structures that include information regarding corrective actions to be taken upon identifying that a computing device has entered a predetermined state. As noted above, when a computing device enters a predetermined state, a workload being performed may be unable to be completed or otherwise negatively impacted by the predetermined state. The performance response repository (152) may specify one or more actions that may be performed by a computing device to address the predetermined state.

For example, the performance response repository (152) may specify that when a computing device enters an error state while performing a database workload, the computing device should perform a response including (i) terminate the database workload, (ii) instantiate a new instance of the database workload, and (iii) reduce the quantity of computing resources (e.g., processor cycles, memory space, storage space, network bandwidth, etc.) allocated towards completion of the database workload. The responses specified by the performance response repository (156) may include any number (e.g., more, less than, or equal to 3 actions) and type of actions without departing from the invention. Different responses associated with different predetermined states may include different numbers and types of actions.

While the data structures stored in storage (144) have been described as including a limited amount of specific information, any of the data structures stored in storage (144) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example deployment manager (140) has been described and illustrated as including a limited number of components for the sake of brevity, a deployment manager in accordance with embodiments of the invention may include additional, fewer, and/or different components than those illustrated in FIG. 1.3 without departing from the invention.

Additionally, any of the data structures described with respect to FIGS. 1.2 and 1.3 may be implemented using, for example, lists, tables, linked lists, database, and/or any number and/or type of data structure without departing from the invention.

Returning to FIG. 1.1, the deployment manager (110) may manage computing devices of a deployment using information obtained from the computing devices. FIGS. 2.1-3 illustrate methods that may be performed by the deployment manager of the system of FIG. 1.1 when managing the computing devices.

FIG. 2.1 shows a flowchart of a method in accordance with one or more embodiments of the invention. The method depicted in FIG. 2.1 may be used to identify how to manage a computing device in accordance with one or more embodiments of the invention. The method shown in FIG. 2.1 may be performed by, for example, a deployment manager (e.g., 110, FIG. 1.1). Other components of the system illustrated in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In step 200, event descriptions associated with a computing device are obtained. The event descriptions may be obtained by, for example, requesting that the computing device provide the event descriptions. In response to the request, the computing device may provide the event descriptions. The event descriptions may be obtained via other methods without departing from the invention.

As discussed, the event descriptions may include information indicative of state transitions (e.g., change in operating state) of the computing device. Any number of event descriptions may be obtained. For example, event descriptions may be obtained over a period of time. The period of time may be of a sufficient duration that the computing device underwent a majority of possible state transitions during the period of time. The period of time may be, for example, 30 minutes, 1 hour, 12 hours, 24 hours, 2 days, 7 days, 2 weeks, 1 month, 2 months, etc. The duration of the period of time may depend upon the number of operating states of the computing device.

The number of operating states of the computing device may not be known when the event descriptions are obtained. For example, the computing device may not operate in a manner consistent with a known state model. Rather, the computing device may have been designed and/or implemented using modalities other than state machine modeling.

The obtained event descriptions may be stored as part of a repository or other type of data structure.

In step 202, state representations for the computing device are populated using the event descriptions.

In one or more embodiments of the invention, the state representations for the computing device are populated by adding state transitions associated with the computing device to a state repository. Each of the state transitions may include (i) a condition, (ii) a list of possible next states, (iii) a probability of each of the next states of the list of possible next states occurring upon an occurrence of the condition, and/or (iv) a list of durations of time, each associated with one of the next states, that indicates how long from which the computing device with transition to the associated state following an occurrence of the condition.

In one or more embodiments of the invention, the state representations for the computing device are obtained by performing one or more of: (i) enumerating all of the components of the computing device, (ii) conditioning the event descriptions for noun-verb analysis, (iii) performing noun-verb phrase analysis of the conditioned event descriptions to obtain portioned event descriptions, (iv) performing computing device specific meaning analysis of one or more portions of the portioned event descriptions to identify characteristics of the components, (v) converting the portioned event descriptions and/or the characteristics of the components into a list of component specific events to obtain potential state transitions, (vi) grouping the portioned potential state transitions on a per-component level, (vii) generating a state model of each of the components based on the respective group associated with the respective component and associating each state transition of the state model with a transition time, (viii) identifying desired and undesired states of the respective state models, and/or (ix) identifying events that trigger the state transitions. The state repository may be updated using the above analysis by adding transitions between the states that are each associated with a noun-verb phrase that may be include in an alert. Consequently, when an alert (or other type of data structure) is obtained from a computing device, the informational content of the alert may be matched to a state transition included in the state repository.

However, because all of the states of the computing device may not be known (due to limits in the quantity of event descriptions used in the above analysis), alerts or other data structures may not match a state representation included in the state repository. In such a scenario, as will be discussed below, the above analysis may be performed including the alert that did not match to a state representation to add additional information to the state model for the component. Each portion of the above method of obtaining state representations is discussed below.

In one or more embodiments of the invention, the components of the computing device are enumerated using existing information regarding the computing device. For example, a knowledge lake may be constructed for the components. The knowledge lake may include a dictionary of all names of all components in the computing device including, for example, physical and/or logical components. The knowledge lake may be constructed by querying the resources maintained by the computing device, the deployment manager, and/or other devices to obtain all of the component identifiers. When constructing the knowledge lake, a unique instance identifier may be assigned across all components in the dictionary of the knowledge lack.

In one or more embodiments of the invention, the event descriptions are conditioned for noun-verb phrase analysis for noun-verb analysis by (a) conditioning each of the event descriptions and/or (b) identifying any component identifiers included in the event descriptions. To condition the event descriptions, the text included in the event descriptions may be normalized by removing whitespace, unprintable characters, and/or otherwise placing the text in condition for natural language or other types of language processing. When identifying the component identifiers, a component identifier of maximum length may be identified and used but the alert may be associated with the component to which the alert is directed.

For example, consider a scenario where the text of an event description includes "disk 1 in enclosure 1 in controller 1." The aforementioned text may overlap with the text "enclosure 1 in controller 1" which, in turn, overlaps with "controller 1". In this scenario, the identifier "disk 1 in enclosure 1 in controller 1" would be used as the identifier (i.e., the most specific) but the alert is associated with disk 1 because it is the object of the alert (in contrast enclosure 1 and controller 1 are merely additional clarifiers used to identify disk 1).

In one or more embodiments of the invention, noun-verb phrase analysis of the conditioned event descriptions to obtain portioned event descriptions is performed by splitting each of the conditioned events by using the component identifier as a delimiter. In scenario in which there are multiple component names present in the alert, the alert is split for each such component identifier. The alert substrings (without component identifiers) are separated as separate portions.

To further clarify noun-verb phrase analysis, examples of dividing the conditioned event descriptions to obtain portioned event descriptions is provided as follows:

Example Alert 1: "disk 1 in enclosure 1 in controller 1 is online"

Portioned Alert 1: Component Identifier=["disk 1 in enclosure 1 in controller 1"]; Substring=["is online"]

Example Alert 2: "enclosure 1 in controller is critical"

Portioned Alert 2: Component Identifier=["enclosure 1 in controller 1"]; Substring=["is online"]

Example Alert 3: "License EID0000001x assigned to device controller 1 expires in 10 days"

Portioned Alert 3: Component Identifier=["License EID0000001x", "controller 1"]; Substring=["assigned to device", "expires in 10 days"]

Example Alert 4: "A patrol read operation started for controller 1."

Portioned Alert 4: Component Identifier=["controller 1"]; Substring=["A patrol read operation started for"]

Example Alert 5: "The patrol read operation completed for controller 1."

Portioned Alert 5: Component Identifier=["controller 1"]; Substring=["The patrol read operation completed for"]

In one or more embodiments of the invention, computing device specific meaning analysis of one or more portions of the portioned event descriptions to identify characteristics of the components is performed by natural language processing or other language analysis algorithms to identify computing device specific meanings of each of the component identifier and/or substring of each alert. The language analysis algorithm may be trained on terminology that is specific to the components of the computing device. For example, a specific technical diction of terms commonly used to describe the components of the computing devices may be used to train the language analysis algorithm.

In some embodiments of the invention, objects of verb phrases or objective noun phrases (e.g., warning thresholds) are treated as part of verb phrases. Each noun phrase may be treated as a separate component identifier.

The result of the computing device specific meaning may be a list of noun phrases and verb phrases each having computing device specific meaning and associated with a respective component identifiers.

For example, with respect to the above 5 example alerts, the resulting alerts may be portioned as follows:

Portioned Example Alert 1:
Noun Phrase=<empty>
Verb Phrase=["is online"]
Component Identifier=["disk 1 in enclosure 1 in controller 1"]

Portioned Example Alert 2: "enclosure 1 in controller is critical"
Noun Phrase=<empty>
Verb Phrase=["is critical"]
Component Identifier=["enclosure 1 in controller 1"]

Example Alert 3: "License EID0000001x assigned to device controller 1 expires in 10 days"
Noun Phrase=<empty>
Verb Phrase=["assigned to device", "expires in 10 days"]
Component Identifier=["License EID0000001x", "controller 1"]

Example Alert 4: "A patrol read operation started for controller 1."
Noun Phrase=["patrol read operation"]
Verb Phrase=["started"]
Component Identifier=["controller 1"]

Example Alert 5: "The patrol read operation completed for controller 1."
Noun Phrase=["patrol read operation"]
Verb Phrase=["completed"]
Component List=["controller 1"]

As noted above, in the above examples, the verb phrases also include objective noun phrases.

In one or more embodiments of the invention, the portioned event descriptions and/or the characteristics of the components are converted into a list of component specific events to obtain potential state transitions by aggregating the component identifiers and noun phrases into a key list. The verb phrases, associated with each of the aforementioned keys, are used as the states of the system.

For example, with respect to the five alerts above, the resulting state transitions of the state representations may be represented as follows (key=>state):

["disk 1 in enclosure 1 in controller 1"]=>("is online")
["enclosure 1 in controller 1"]=>("is critical")
["License EID0000001x", "controller 1"]=>("assigned to device/expires in 10 days")
["controller 1", "patrol read operation"]=>("started", "completed")

To construct a more exhaustive lists of states, alerts may be collected that correspond to a longer period of time. A verification process may be performed where alerts are collected over a first period of time and used to generate the state transitions of the state representations and additional alerts may be collected over a second period of time. If no alerts collected over the second period of time are unknown (e.g., do not map to a state in the state repository), the resulting state model may be considered to be accurate and used. If determined as being inaccurate, additional alerts may be collected and used to refine (e.g., add more) the state representations.

Using the above state representations, state transitions between the states are constructed. The state transitions may be constructed by, for example, using the times that the alerts were generated to create a temporal ordering between the alerts and the corresponding states. For example, as discussed above, the verb phrases included in each of the alerts may be used to ascertain when the state of the component changes. The temporal ordering between the alerts may then be used to define (i) that a transition has occurred and (ii) the duration of time required for the transition to occur (e.g., from when a verb phrase indicating a state is generated to when a second verb phrase indicating a second state is generated).

The resulting state transition may specify, for the occurrence of an alert matching the state representation including the state transition: (i) a number of potential next states, (ii) a duration of time, and (iii) a likelihood that the component will transition to each of the potential next states. For example, when a temporal ordering is used to define the state transitions, a transition from a first state may not always result in a transition to a second state. For example, a component may transition from a first state to any number of any states after the first state.

To further clarify a state representation in accordance with embodiments of the invention, Table 1 (below) illustrates information included in the table for an example alert type. In table 1 below, the included information represents how a state transition may be defined for a state representation. The first column represents the potential next states (i.e., each row) that may occur when an event description matching is state representation is received. In column 1, the next states are simply listed as 1, 2, 3, etc. for simplicity. In practice, each of these states would have a name or other indicator of the next state rather than a numerical identifier. Based on column 1, there are ten potential next states for the event description associated with table 1.

The second column specifies the transition time associated with each of the next states. As seen from column 2, some of the transition times are represented as ranges indicating that the event descriptions used to generate the state transitions indicated that there was some variation between when the event description.

The third column specifies the frequency that the next states occurred in the event descriptions used to generate the table. In practice, this information may not be retained as part of the state representations.

The fourth column specifies the normalized probabilities (e.g., each frequency specified by each row of column 3 divided by the sum of the frequencies of column 3). The normalized probabilities represent the likelihood that the component will transition to the corresponding next state upon the occurrence of an event description associated with table 1.

TABLE 1

Example state representation information

| Next State | Transition Time | Frequency | Probability |
| --- | --- | --- | --- |
| 0 | 0 min | 2 | 0.04 |
| 1 | 0-8640 min | 5 | 0.1 |
| 2 | 8640-17280 min | 4 | 0.08 |
| 3 | 17280-25920 min | 4 | 0.08 |
| 4 | 25920-34560 min | 7 | 0.15 |
| 5 | 34560-43200 min | 0 | 0 |
| 6 | 43200-51840 min | 0 | 0 |
| 7 | 51840-60480 min | 1 | 0.02 |
| 8 | 60480-69120 min | 5 | 0.1 |
| 9 | 69120-77760 min | 6 | 0.13 |
| 10 | 77760-86400 min | 14 | 0.29 |

While the state representation is illustrated in Table 1 as including a specific type and quantity of information in a specific format (i.e., a table), state representations in accordance with one or more embodiments of the invention may include additional, different, and/or less data in other formats (e.g., lists, linked lists, databases, etc.) without departing from the invention.

In one or more embodiments of the invention, desired and undesired states of the respective state models are identified by performing sentiment analysis on the state names associated with each state of the state model. Any negative sentiment ("failed", "critical", "canceled", "stopped") is considered as a non-final state (e.g., undesired). In contrast, positive sentiment ("success", "completed", "healthy") are considered as positive states and are desired final state.

In one or more embodiments of the invention, repeated states based on sentiment analysis may be ignored. Similarly, any action that occurs due to user operation is excluded from being a desired final state. Rather, such user-initiated action may be considered a triggered state, discussed in greater detail with respect to FIG. 3.

In one or more embodiments of the invention, any state that results in closing of a ticket (or other type of action logging system) included in a support system for the computing device may be considered a desired final state.

In one or more embodiments of the invention, any state associated with positive sentiment and/or the health of the corresponding component is considered a desired final state.

In one or more embodiments of the invention, events that trigger the state transitions are identified by tracing back through the series of state transitions associated with a non-final state. The aforementioned method of tracing may be used to identify an event that lead to a non-final state. In other words, an undesired outcome such as a failure state of a component. By identifying the event that lead to the non-final state, a method for remediating the non-final state may be identified. For additional details regarding performing a state transition trace, refer to FIG. 3.

The aforementioned state representations may be populated by adding them to a state repository and associating them with the computing device. The state representations may be added by adding additional information to the state repository, modifying existing information to the state repository, and/or removing information from the state repository.

In step 204, a new event description associated with the computing device and a workload is obtained. The new event description may not have been used to populate the state representations in step 202. The new event description may be obtained using similar methods as described with respect to step 200.

In step 206, it is determined whether the new event description matches a state representation. The new event description may be subjected to the same processing as described with respect to step 202. The result of the processing may be compared against the information included in the state repository. If the comparison does not indicate a match, the method may proceed to the box labeled as "B" in FIG. 2.3. If the comparison does indicate a match, the method may proceed to the box labeled as "A" in FIG. 2.2.

Turning to FIG. 2.2, FIG. 2.2 shows a continuation of the flowchart of the method illustrated in FIG. 2.1. In step 210, a predictions of a likely state transition to a new state and a state transition time for the new state is generated. The prediction may be generated using the state repository. In other words, the information to which the new event description matched may be used to identify the likely state transition and state transition time. As discussed above, the state representation to which the new event description matched may include the aforementioned information.

In step 212, it is determined whether the new state and/or the transition time meet requirements of the workload.

For example, the workload may specify that it needs to complete (e.g., cannot just be partially completed). If the new state indicates a failure, suspension of performance of the workload, and/or other issue that may be problematic, it may be determined that the new state does not meet the requirements of the workload.

In another example, the workload may specify that it needs to complete within a predetermined amount of time. If the transition time indicates that it will take too long between when the workload is initiated and completion of the workload due to the transition time, it may be determined that the transition time does not meet the requirements of the workload.

If it is determined that the new state and/or the transition time do not meet the requirements of the workload, the method may proceed to step 214. If it is determined that the new state and/or the transition time do meet the requirements of the workload, the method may end following step 214.

In step 214, the workload is remediated.

In one or more embodiments of the invention, the workload is remediated by performing the method illustrated in FIG. 3.

In one or more embodiments of the invention, the workload is remediated by notifying an administrator of the computing device of the state representation.

In one or more embodiments of the invention, the workload is remediated by transitioning its performance to other components. For example, if the workload is utilizing a processor of the computing device for its performance, the workload may be transitioned to a second processor.

In one or more embodiments of the invention, the workload is remediated by allocating additional computing resources to performance of the workload. For example, additional processor cycles, memory space, storage space, communication bandwidth, etc. may be allocated towards performance of the workload.

The method may end following step 214.

Returning to FIG. 2.1, the method may proceed to box "B" of FIG. 2.3 following step 206. FIG. 2.3 shows a flowchart of a continuation of the method illustrated in FIG. 2.1.

In step 220, a new state representation is populated for the computing device using the new event description. In other words, if an event description does not match a state representation in the state repository, it may be determined that the new event description includes information representative of a new state of the component. The processed described with respect to step 202 of FIG. 2.1 may be used to generate a new state representation based on the new event description and the new state representation may be added to the state repository.

The method may return to step 204 following step 220.

Thus, via the methods illustrated in FIGS. 2.1-2.3, a system in accordance with embodiments of the invention may identify any number of states of components and manage the operation of the states of the components based on the identified states of the components.

For example, steps 200-202 may be considered an initial training phase where state representations defined by state models of the components are developed using historical information. The aforementioned steps may be repeated for any number of computing devices to generate state models and obtain state representations for each of them. Once trained, the remaining steps of FIGS. 2.1-2.3 may be repeatedly performed to manage the computing devices by responding to event descriptions as they are generated. Consequently, workloads performed by the computing devices may be more likely to complete.

As noted with respect to FIG. 2.2, a workload may be remediated if a new state and/or transition time does not meet requirements of a workload.

FIG. 3 shows a flowchart of a method in accordance with one or more embodiments of the invention. The method depicted in FIG. 3 may be used to remediate a workload in accordance with one or more embodiments of the invention. The method shown in FIG. 3 may be performed by, for example, a deployment manager (e.g., 110, FIG. 1.1). Other components of the system illustrated in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a workload performed by a computing device that has reached an undesired state is identified. The undesired state may be a non-final state as discussed with respect to FIG. 2.2. In other words, when the computing device, or a component thereof that impacts performance of the workload, enters a state associated with a negative semantic association.

In step 302, an action trace action set for the workload is performed using the state representations associated with the computing device to identify an initiating action associated with the workload.

Performing the action trace action set may include tracing the series of states that lead to the non-final state of the computing device until a trigger state is identified. To perform the action trace action set, any request that enters the system (e.g., a command line interface or application programming interface call) may be tracked (e.g., associated with a workload generated by the call). The end point (host/port) that originated the call may also be tracked (e.g., associated with the workload).

Internal operations may be tracked (e.g., calls made by components performing portions of the workload). Information regarding the initiated of the internal operations may also be tracked.

The aforementioned tracked information may be stored until the workload is completed.

Additionally, when a workload is altered through an operation (e.g., canceling), any new instanced of the workload are linked to the workload.

The above tracked information may enable the initiating event/action of a workload to be identified. Consequently, the parameters used to initiate the workload may be identified.

In step 304, an initiating action remediation action set is performed based on the initiating action to place the workload in a desired state.

In one or more embodiments of the invention, the initiating action remediation set includes (i) terminating the workload and (ii) instantiating a new instance of the workload using parameters that are different from those originally used when the workload was initially instantiated. For example, parameters that cause a different the computing device to be more likely to transition to other states (than those through which were traced back to the initiating action) than those that the first instance of the workload caused the computing device to arrive.

In some embodiments of the invention, the same parameters may be used to initiate the workload. For example, when performing the action trace action set, any number of state representations may be identified. If the state representations indicate that the computing device transitioned to an unlikely to occur non-final state necessitating the remediation, the same parameters may be used.

In some embodiments of the invention, an administrator or user associated with the workload may be notified of the termination of the workload and may request that the user provide different parameters for instantiating a new instance of the workload.

The method may end following step 304.

Using the method illustrated in FIG. 3, a workload may be remediated by causing it to be restarted in a manner that is less likely for it to place the computing device in an undesired state.

Figure 4:
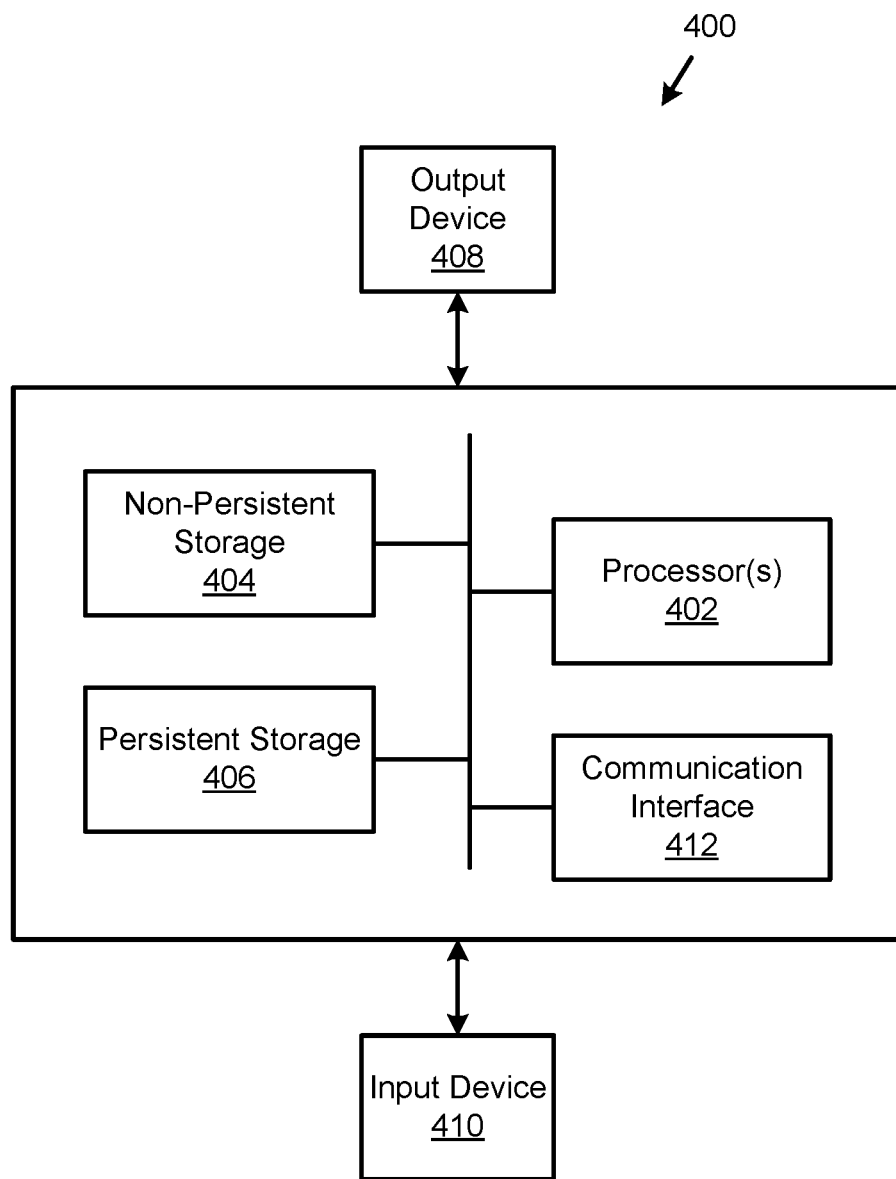
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a method and system for managing deployments, computing devices, and/or components thereof based on states of the aforementioned components derived from alerts (or other types of data structures) generated by these devices. By doing so, the likely future operational states of the devices may be ascertained using the obtained states. By doing so, undesirable states (e.g., failure states) may be proactively avoided and/or remediated. Consequently, a system, device, and/or component in accordance with embodiments of the invention may be more likely to successfully complete workloads. Accordingly, workloads being performed by deployments may be more likely to be completed in accordance with desired targets (e.g., durations of time for completion).

Thus, embodiments of the invention may address the problem of limited computing resources for completing workloads. Specifically, embodiments of the invention may improve the likelihood that workloads will be completed successfully using the same quantity of computing resources.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A deployment manager, comprising:
storage for storing:
a state repository comprising a plurality of state transitions associated with event descriptions generated by a computing device, wherein the event descriptions comprise alerts generated by components of the computing device, wherein the alerts comprise noun-verb phrases that describe characteristics of at least one of the components; and
a computing device manager programmed to:
obtain an event description of the event descriptions;
identify a component of the components associated with the event description;
divide the event description into one or more portions that each include only noun or verb phrases;
analyze at least one of the portions to identify a computing device specific meaning of the at least one of the portions;
generate a state transition of the state transitions using an identifier of the component and the computing device specific meaning;
obtain a new event description associated with:
the computing device, and
a workload performed by the computing device;
in response to obtaining the new event description:
match the new event description to the state transition; and
manage the workload based on a predicted next state associated with the state transition.

2. The deployment manager of claim 1, wherein generating the state transition of the state transitions using the identifier of the component and the computing device specific meaning comprises:
identifying a next state associated with the computing device specific meaning; and
associating the identifier of the component, the computing device specific meaning, and the next state.

3. The deployment manager of claim 2, wherein the computing device manager is further programmed to:

a first likelihood that the computing device will transition to the next state when the component is associated with an occurrence of an event that is associated with the computing device specific meaning, and a second likelihood that the computing device will transition to a second next state when the component is associated with the occurrence of the event that is associated with the computing device specific meaning.

4. The deployment manager of claim 1, wherein managing the workload based on a predicted next state associated with the state transition comprises:
obtain a second new event description associated with:
the computing device, and
the workload performed by the computing device;
in response to obtaining the second new event description:
make a determination that the second new event description does not match any state transition of the plurality of state transitions; and
discard the second new event description without managing the workload.

5. The deployment manager of claim 1, wherein the computing device manager is programmed to discard at least 99% of event descriptions generated by the computing device without determining that a state of the computing device is likely to change.

6. The deployment manager of claim 1, wherein the computing device manager is programmed to add a new state transition to the state transitions when any event description that is obtained does not match any of the state transitions.

7. The deployment manager of claim 1, wherein the state transition specifies that the computing device is more likely to transition to the next state than a second next state.

8. The deployment manager of claim 1, wherein the state transition further specifies a transition time associated with the next state and a second transition time associated with the second next state.

9. The deployment manager of claim 1, wherein the new event description comprises a human readable description of a computing device event.

10. The deployment manager of claim 1, where managing the workload based on the predicted next state associated with the state transition comprises:
terminating the workload;
instantiating a new instance of the workload hosted by the computing device; and
modifying an operation of the workload to avoid the predicted next state.

11. The deployment manager of claim 1, where managing the workload based on the predicted next state associated with the state transition comprises:
allocating additional computing resources to the workload, wherein an amount of the additional computing resources is based on a transition time associated with the predicted next state.

12. A method for managing a computing device using a plurality of state transitions associated with event descriptions generated by the computing device, comprising:
obtaining an event description of the event descriptions, wherein the event descriptions comprise alerts generated by components of the computing device, wherein the alerts comprise noun-verb phrases that describe characteristics of at least one of the components;
identifying a component of the components associated with the event description;
dividing the event description into one or more portions that each include only noun or verb phrases;
analyzing at least one of the portions to identify a computing device specific meaning of the at least one of the portions;
generating a state transition of the state transitions using an identifier of the component and the computing device specific meaning;
obtaining a new event description associated with:
the computing device, and
a workload performed by the computing device;
in response to obtaining the new event description:
matching the new event description to the state transition; and
managing the workload based on a predicted next state associated with the state transition.

13. The method of claim 12, wherein the state transition specifies that the computing device is more likely to transition to the next state than a second next state.

14. The method of claim 12, wherein the state transition further specifies a transition time associated with the next state and a second transition time associated with the second next state.

15. A non-transitory computer readable medium comprising computer readable program code, which when executed by a computer processor enables the computer processor to perform a method for managing a computing device using a plurality of state transitions associated with event descriptions generated by the computing device, the method comprising:
obtaining an event description of the event descriptions, wherein the event descriptions comprise alerts generated by components of the computing device, wherein the alerts comprise noun-verb phrases that describe characteristics of at least one of the components;
identifying a component of the components associated with the event description;
dividing the event description into one or more portions that each include only noun or verb phrases;
analyzing at least one of the portions to identify a computing device specific meaning of the at least one of the portions;
generating a state transition of the state transitions using an identifier of the component and the computing device specific meaning;
obtaining a new event description associated with:
the computing device, and
a workload performed by the computing device;
in response to obtaining the new event description:
matching the new event description to the state transition; and
managing the workload based on a predicted next state associated with the state transition.

16. The non-transitory computer readable medium of claim 15, wherein the state transition specifies that the computing device is more likely to transition to the next state than a second next state.

17. The non-transitory computer readable medium of claim 15, wherein the state transition further specifies a transition time associated with the next state and a second transition time associated with the second next state.

* * * * *